United States Patent [19]

Gustavsson et al.

[11] 4,027,758

[45] June 7, 1977

[54] WET DISC CLUTCH AND METHOD OF FORCE COOLING THE SAME

[75] Inventors: Värne Axel Gerhard Gustavsson; Lars-Göran Moberg, both of Karlskoga, Sweden

[73] Assignee: AB Bofors, Bofors, Sweden

[22] Filed: Nov. 7, 1975

[21] Appl. No.: 629,954

[30] Foreign Application Priority Data

Nov. 15, 1974 Sweden .............................. 7414359

[52] U.S. Cl. .................... 192/113 B; 188/264 E; 192/58 C
[51] Int. Cl.² ........................................ F16D 13/72
[58] Field of Search ............... 192/113 B, 57, 58 B, 192/58 C, 18 A, 70.12; 188/264 E, 264 P

[56] References Cited

UNITED STATES PATENTS

| | | | |
|---|---|---|---|
| 2,556,809 | 6/1951 | Hobbs | 192/113 B |
| 2,690,248 | 9/1954 | McDowall | 192/113 B |
| 3,463,281 | 8/1969 | Aschauer | 192/113 B |
| 3,534,842 | 12/1968 | Davidson | 192/113 B |

FOREIGN PATENTS OR APPLICATIONS

| | | | |
|---|---|---|---|
| 2,042,289 | 3/1972 | Germany | 192/113 B |

*Primary Examiner*—Benjamin W. Wyche
*Attorney, Agent, or Firm*—Pollock, VandeSande & Priddy

[57] ABSTRACT

A wet disc clutch is force cooled by feeding a cooling liquid under pressure from locations adjacent the axis of rotation of the clutch into the region between the friction surfaces of the clutch discs through a pattern of grooves formed in at least one of the disc surfaces and comprising a plurality of radially extending distribution grooves which communicate with a helical array of cooling grooves which in turn communicate with a plurality of radially extending conveying grooves, located between the distribution grooves, and communicating with constricted outlets disposed adjacent the outer edges of the discs.

12 Claims, 9 Drawing Figures

WET DISC CLUTCH AND METHOD OF FORCE COOLING THE SAME

In order to connect two shafts together, which are rotating with different speeds, and thereby make the two shafts rotate with the same speed disc clutches of various kinds are often used. During the time, the slip-in time, which it takes from the instant the discs begin to act upon each other until the relative speed between the shafts in zero, the clutch discs slip against each other, and energy losses then arise which cause friction heat in the surfaces of the discs. This friction heat must in some way be conveyed away from the disc surfaces, and in principle, there should be time for the energy losses from one clutch engagement to be cooled off before the next engagement is to take place. This applies particularly to periodically working clutches, as the clutch discs can otherwise easily become overheated, and the friction surfaces subjected to abnormal wear.

The methods of cooling a friction clutch can be varied from only natural cooling through conduction and convection, possibly improved by allowing the clutch to work in an oil bath, to strictly forced cooling, achieved by having air or fluid pressed through channels in the discs.

The present invention relates to a new method of achieving forced cooling of liquid cooled so-called wet disc clutches with friction surfaces with a radial extent centered around the input and output shafts of the clutch. The invention also comprises a special type of groove pattern intended to be made in the friction surfaces of a disc clutch. The method characteristic for the invention of cooling the clutch is achieved by an appropriate distribution of pressure being achieved in the cooling medium circulating throught the groove pattern.

Through the present invention, it has become possible, in a comparatively simple way, to obtain extremely efficient cooling of primarily flat single or mulitple disc clutches with ringformed clutch disc surfaces, but the invention can also be used for so-called cone clutches, i.e. clutches which have disc surfaces in the form of truncated cones.

With the method according to the invention, the cooling desired is achieved in that a cooling medium, which particularly consists of an appropriate fluid and which from the edge of the disc which is nearest the axis of rotation of the clutch, during at least the time when the clutch is engaged, is conducted in between the friction surfaces of the disc in the friction layer, along inner, radial distribution grooves provided in at least one of the two friction surfaces in each pair of discs that coact when the clutch is engaged, which grooves extend from said edge of the disc across part of the width of the disc but not across its entire width, after which the cooling medium from these inner distribution grooves is distributed to a number of uniformly distributed cooling grooves made over the width of the surface layer of the disc extending from the inner distribution grooves, the main direction of which is parallel to the direction of rotation of the clutch, and from which the cooling medium is conveyed off radially towards the outer edges of the disc surfaces, along radial conveying grooves formed in the surface layers of the discs, which are arranged between the distribution grooves and which extend across part of the width of the disc but not all the way to its outer edge, and which are in connection with outlet openings in the outer edges of the discs.

If no special measures are taken, however, with the disc pattern described above, the cooling medium will be unevenly distributed over the various cooling grooves, due to the difference in distance to these from the center of rotation. Upon rotation of the clutch, the cooling medium will be affected differently by the centrifugal force, depending on the distance to each particle of cooling medium from the center of rotation. This has the result that the pressure in the cooling medium increases with the distance from the center of rotation, and thus that the cooling channels at the greatest distance from the center of rotation will have the greatest quantity of cooling medium flowing through them per unit of time. Such an uneven distribution of the cooling medium naturally also results in uneven cooling of the clutch discs.

However, we have found that by making an appropriate constriction in the outlet openings of the conveying grooves, it is possible to generate a counter-pressure against the cooling medium flowing out of the cooling grooves which increases in dependence on the distance to the center of rotation. It has thereby become possible, in spite of the centrifugal force, to achieve substantially the same pressure over all cooling grooves, independent of their radial distance on the clutch disc. The pressure in the cooling grooves thus increases with the distance, but at the same time the counter-pressure out of the cooling grooves also increases. This results in a uniform cooling of the entire disc surfaces, and provides for optimizing of both the disc surfaces and the cooling medium flow, with consideration taken to the highest permissible stresses on both the cooling medium and the material in the discs. It has thereby become possible in an entirely different way than previously to produce disc packs that can be utilized optimally.

The constriction in the outlet openings of the conveying grooves can either be made strictly as a constriction of the cross-section area of the groove, or else the cooling medium from the conveying groove can be distributed to a new set of cooling grooves which run parallel to the previously mentioned cooling grooves, and which in itself gives rise to the constriction of the outlet of the conveying grooves desired, and which emerge in outer outlet grooves which, in turn, either can have a free outlet to the outer edge of the disc, or else these too can each be provided with a constricted outlet. If the constrictions are properly dimensioned with consideration to the quantity of cooling medium fed, the conveying grooves and, when applicable, also the outlet grooves, as long as the clutch is engaged and cooling medium is fed with an appropriate pressure, can be kept entirely filled with cooling medium, the internal pressure of which, through the influence of the centrifugal force, increases with the distance from the center of rotation. If the outlet grooves have a free outlet and thus there is no constriction of their outlet opening (this variant is considerably easier to manufacture) the cooling medium will flow freely out of the outlet groove and the outer half of the ring of the clutch will obtain somewhat uneven cooling, as a somewhat greater portion of the cooling medium will flow through the outer cooling grooves than through the inner cooling grooves in the same disc half. By making the disc in halves, with an inner ring which is entirely uniformly cooled, and an outer ring which is somewhat unevenly cooled, however, in most cases, there will not be greater variations in the cooling but that this can be accepted for practical use. This applies particularly to multiple disc clutches in which each disc has a rather limited radial extent.

In order to be able to drive a sufficient quantity of cooling medium per unit of time through the clutch disc grooves, it is thus necessary that the cooling medium is fed with a certain initial pressure. According to a variant of the invention, this initial pressure of the cooling medium is achieved in that a cooling medium ring of a certain depth when the clutch is engaged is permanently maintained inside the inner edge of the clutch disc. From this cooling medium ring, the cooling medium always has a free outlet to the previously mentioned distribution grooves, and through a continuous feed of additional cooling medium to the ring and possible draining via fixed or possibly adjustable overflow channels of any excess cooling medium, the depth of the ring of cooling medium can be kept at the value desired. In most cases, minor variations of a short duration of this depth must be tolerated, as it must be expected that there will be minor variations in the flow of cooling medium through the cooling grooves at different rotating speeds.

When the clutch is not engaged, and thus no cooling is required, the quantity of cooling medium per unit of time which is fed to the clutch discs can be reduced considerably, but at least for multiple disc clutches, in which the clutch discs, even when the clutch is disengaged, can have little play between the delimiting friction surfaces, a certain quantity of cooling medium should always be distributed between the friction surfaces of the discs, in order to lubricate these, even when a disengaged clutch is rotating freely. In practice, it has thus proved that if a flow of the order of 10Q l/minute is required to cool the slipping, engaged clutch satisfactorily, approximately Q l/minute is required in order to obtain sufficient lubrication while maintaining little power losses when the clutch is disengaged. If the clutch is to work with very varying times between the engaging and disengaging, temperature-sensing members can of course be installed, which during long engaging times limit the flow as soon as the heat developed at the latest slipping-in has been cooled off. As a rule, however, it should thus be most simple to have the flow control connected to the members for engaging and disengaging.

The invention has been defined in the accompanying claims, and will now be described in more detail with reference to a number of figures and examples of embodiments. However, these examples do not involve any limitation of the invention defined in the claims.

Figure 4:
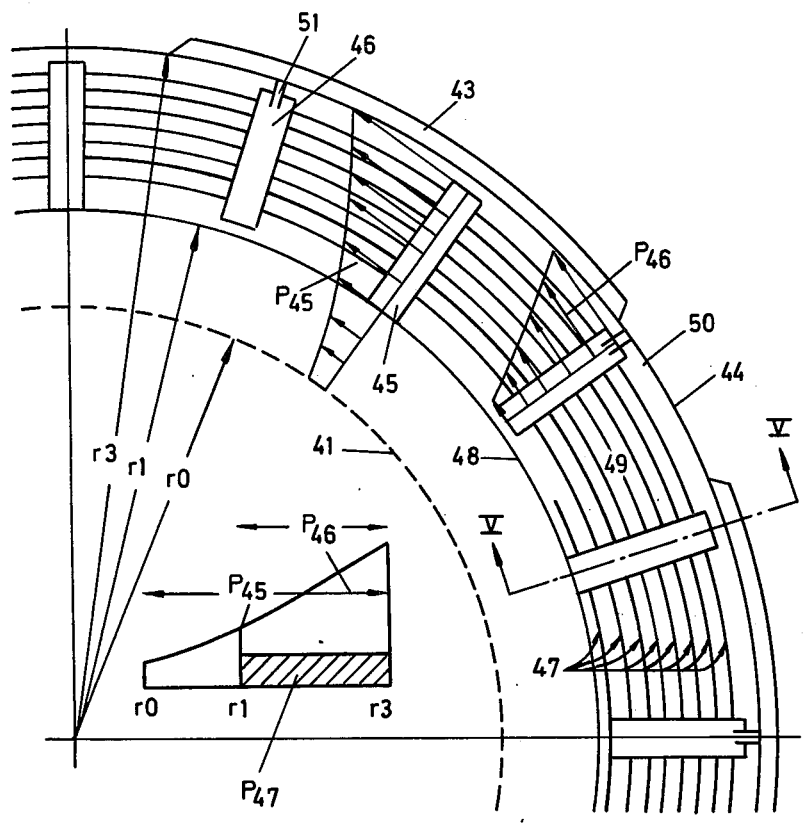
Figure 6:
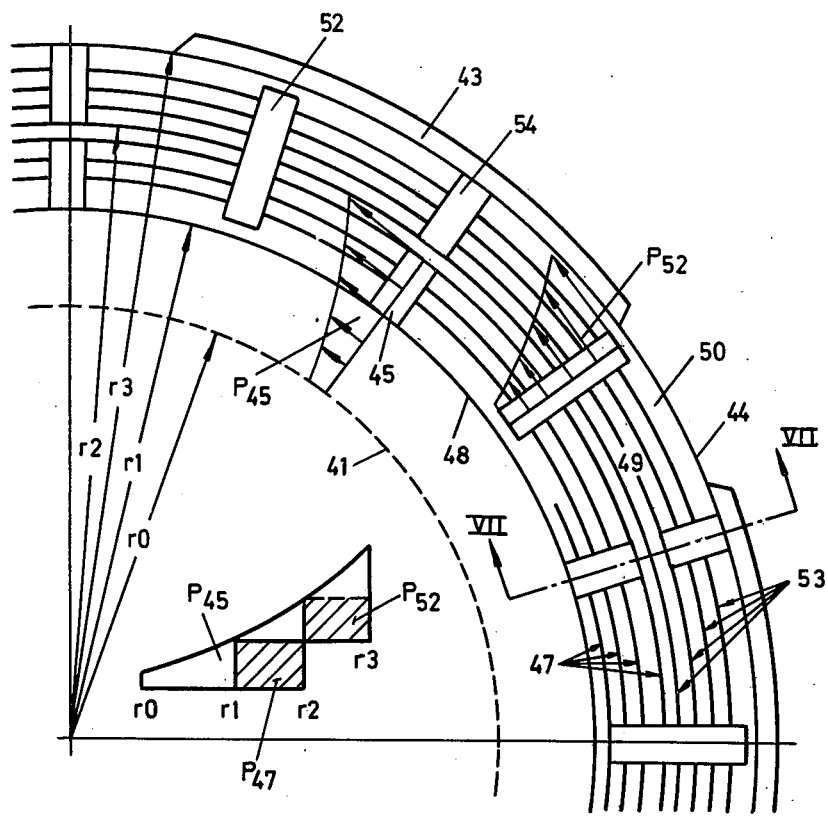
Figure 8:
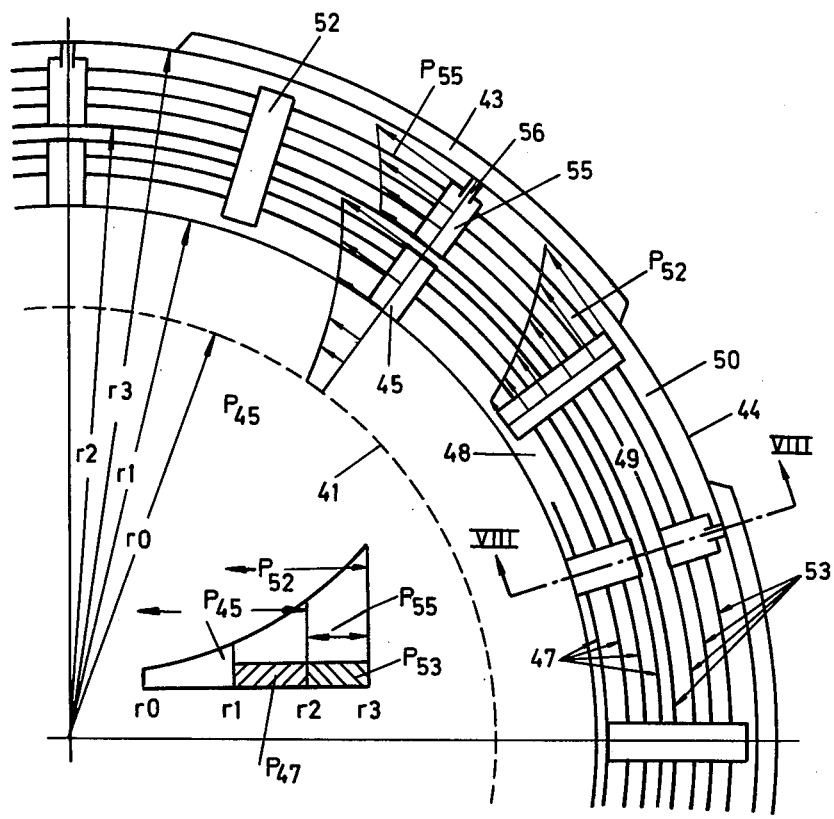

FIGS. 4, 6 and 8 each show a quadrant of clutch discs with different cooling patterns.

Figure 5:
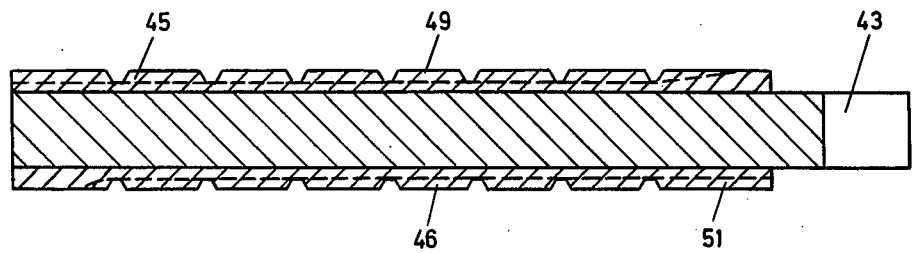
Figure 7:
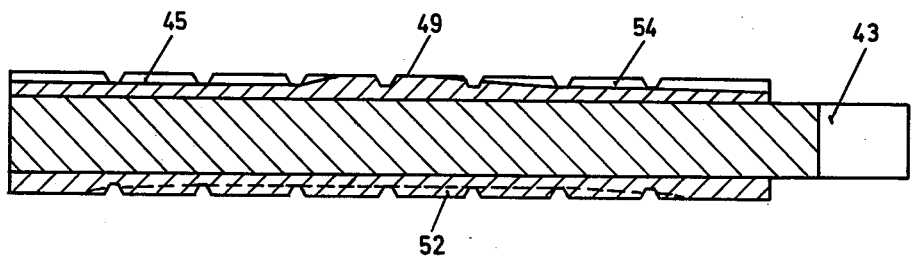
Figure 9:
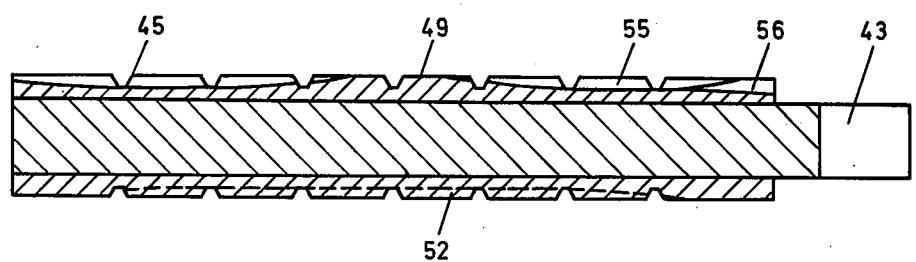

FIGS. 5, 7 and 9 show on a larger scale sections V—V, VII—VII, and VIII—VIII, respectively through the clutch discs according to FIGS. 4, 6 and 8.

Figure 1:
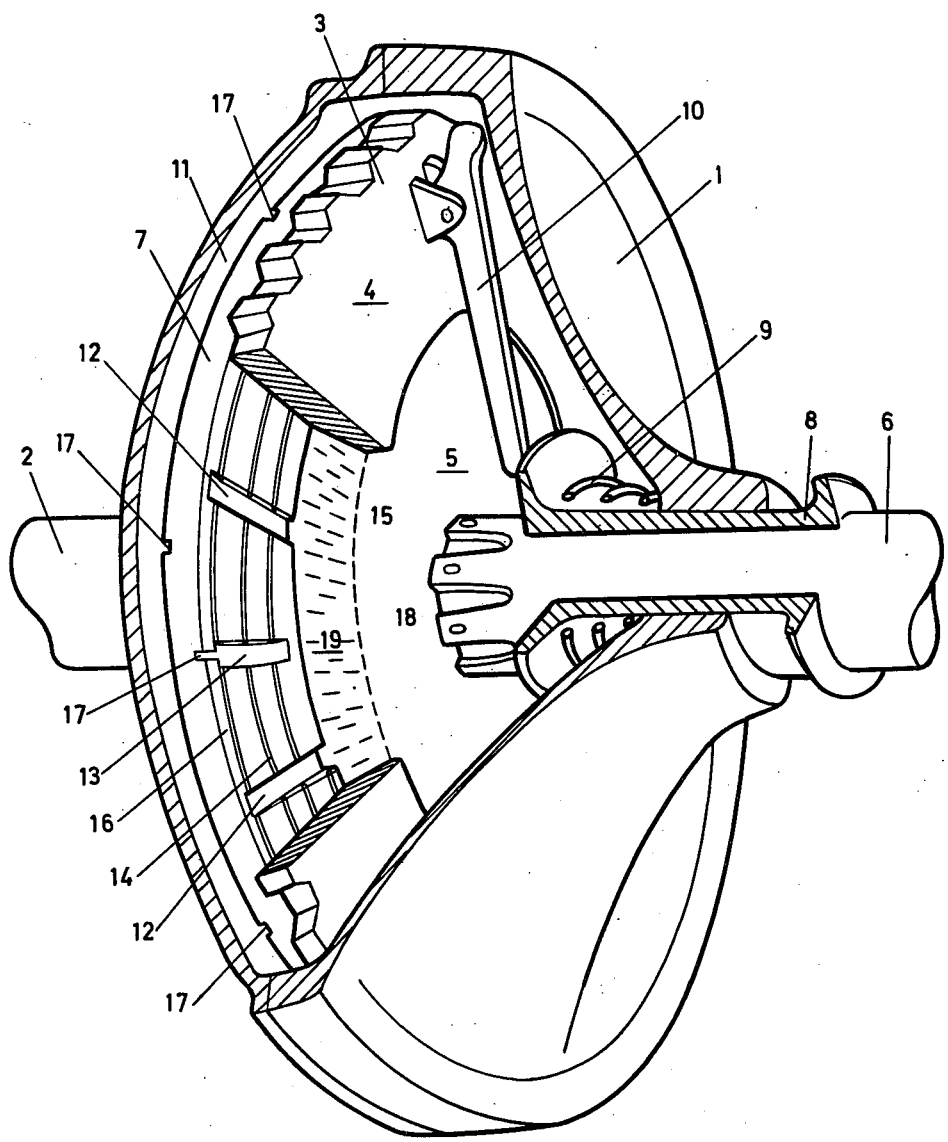
FIG. 1 shows a partly sectioned sketch in perspective of a single-disc clutch.

The clutch shown in FIG. 1 consists of a clutch housing 1, connected with an output shaft 2, and a pressure plate 4 connected displaceably but not rotatably by means of splines with the clutch housing 1. In the clutch housing 1 there is also arranged a clutch disc plate 5, which by means of internal splines is connected with an input shaft 6. Along the outer edge of the clutch disc plate 5, the actual clutch disc 7 is arranged, This consists of a ring-formed friction lining of e.g. sintered metal. When the clutch is not engaged, the input shaft 6 rotates freely in a sleeve 8 arranged in the clutch housing. This sleeve 8, with the aid of a spring 9, also acutates a number of levers 10 arranged on surface 3 of the pressure plate 4, which press the pressure plate 4, against the clutch disc 7 at the same time as disc 7, in turn, is pressed against the inner side 11 of the clutch housing. When the sleeve 8 is pulled, the pressure plate 4 and the clutch housing are disengaged from the clutch disc 7 and the input shaft 6. The friction surface of the clutch disc is provided with the groove pattern characteristic of the invention, consisting of inner, radial distribution grooves 12, outer conveying grooves 13 and cooling grooves 14 uniformly distributed spirally over the clutch disc 7. The inner distribution grooves 12 start at the inner edge 15 of the surface of the friction disc, and end just before they reach its outer edge 16. The outer conveying grooves 13 extend from the outer edge 16 of the disc almost all the way to its inner edge 15. The conveying grooves 13 also have a small constriction 17 at the outlet through the outer edge of the disc.

Cooling medium, in this case some appropriate oil, is fed through the hollow input shaft 6, and is distributed through outlet openings 18. The centrifugal force throws the oil outwards, and when the clutch is engaged, forms an oil ring 19, delimited at the sides by the clutch plate 5 and the pressure plate 4. As shown by the figure, the latter has a considerably greater width than the actual clutch disc or the friction lining 7, the inner edge 15 of which constitutes the outer limits of the oil ring. Any for oil which there is no room behind the pressure plate runs over its edge, and is removed together with the outer cooling oil through an outlet, not shown in the figure, arranged on the rear side of the clutch housing. The depth of the oil ring 19 together with the centrifugal force gives a certain oil pressure, which forces the oil to flow in to the inner distribution grooves 12, to be distributed in both directions in the adjacent cooling grooves 14, and thereafter leave the space between the clutch disc 7 and the pressure plate 4 via the outer conveying grooves 13. As the clutch disc plate 5 is provided with friction linings on both sides, it is also provided with groove patterns on both sides. The oil feed to the rear side not shown in the figure takes place in a similar way as at the front side, and special outlets give rise to an oil ring of the depth desired on this side too. When the clutch is disengaged, the quantity of oil is reduced to approximately one tenth of the normal flow for an engaged clutch.

The constriction 17 is adapted so that at full cooling flow through the grooves in the disc surface, it ensures that the conveying grooves 13 are continuously kept filled with cooling oil. The liquid column which is thus formed in these grooves will then, through the influence of the centrifugal force, have a pressure increasing outwards, which compensates the increase in pressure for the same reason in the outer turns of the cooling grooves 14. In this way, a substantially equal drop in pressure is obtained over all cooling grooves 14, regardless of their distance from the center of rotation, which gives the same flow of cooling oil through all parts of the clutch surfaces, and thus the same cooling of these surfaces, regardless of their distance from the center of rotation.

Figure 2:
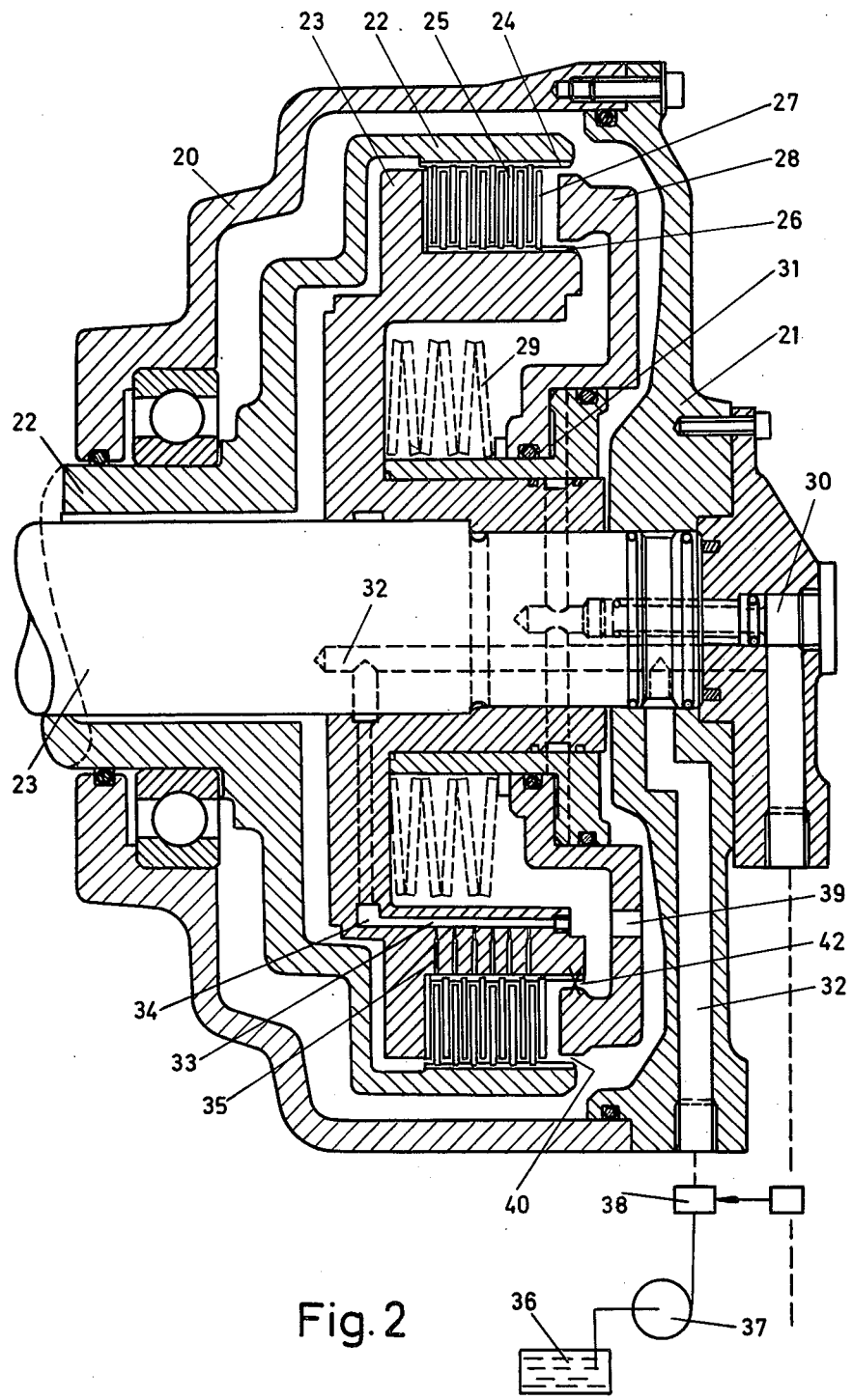
FIGS. 2 and 3 show a section through a multiple-disc clutch, in disengaged and engaged positions respectively.
Figure 3:
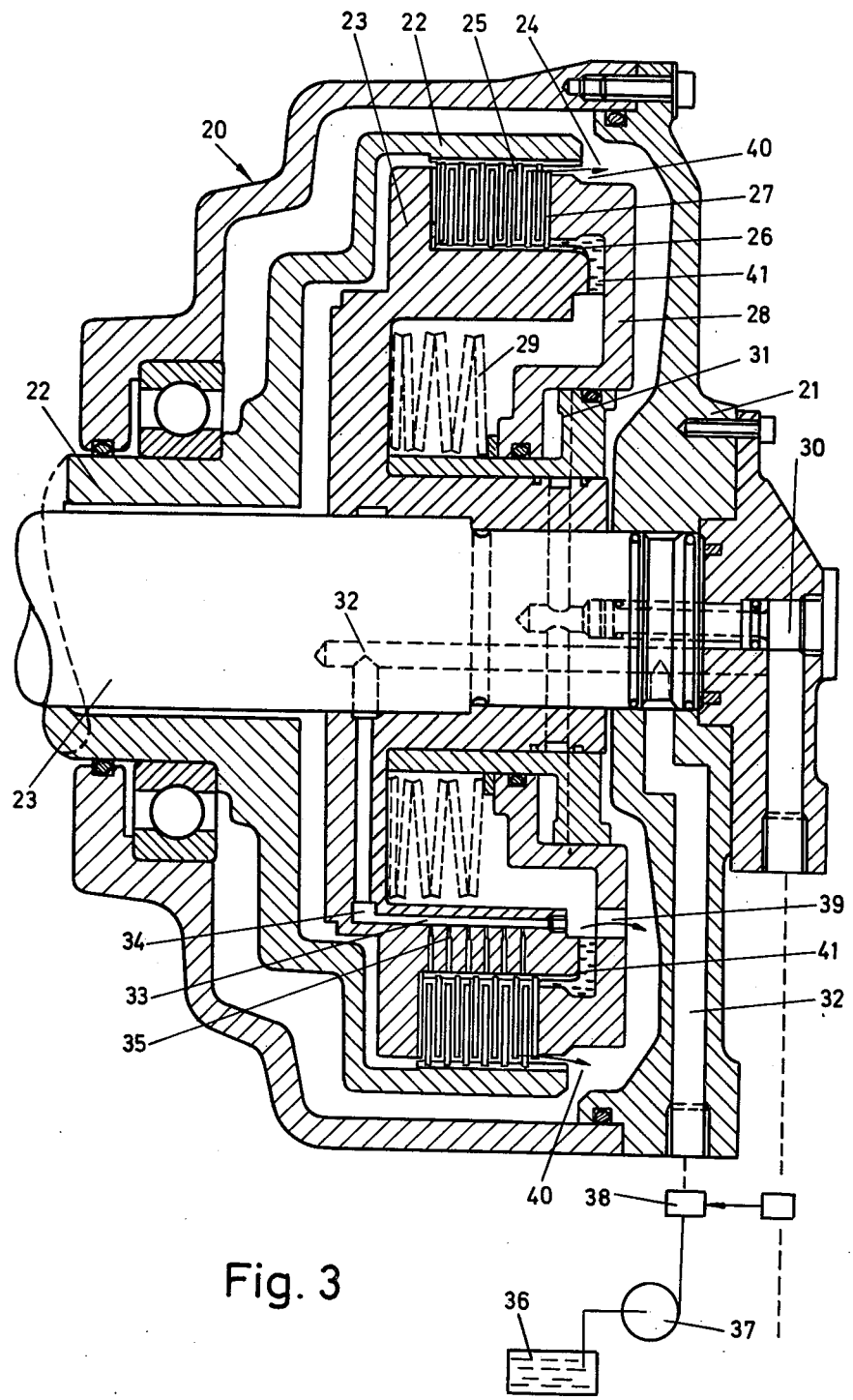

FIGS. 2 and 3 show a section through a wet multiple disc clutch, which is cooled in the way which is characteristic for the invention. FIG. 2 shows the clutch in the disengaged position, and FIG. 3 shows the clutch in the engaged position.

The clutch consists of a clutch housing 20 with a front part 21. Inside the clutch housing 20 there are suspended an outer tubular input shaft 22 and an inner output shaft 23. (The special design with the two shafts arranged one in the other has nothing to do with the invention, but the embodiment has certain advantages, which makes it suitable for special purposes.) The input shaft 22 is connected by means of internal splines 24 with the outer splines of a disc pack 25, which consists of six double-faced friction discs. The inner output shaft 23 is connected by means of splines 26 to the internal splines of a disc pack consisting of seven friction discs 27. A pressure plate 28 is displaceably arranged around the output shaft 23. A spring 29 keeps the pressure plate 28 in the disengaged position. Through the feed of pressure oil through a cavity 30 in the shaft 23 to a hydraulic chamber 31, the pressure plate can be displaced and the clutch engaged (see FIG. 3).

Oil for cooling of the disc 25, 27 is fed through a channel 32 through the shaft 23, from where the oil is distributed to a number of distribution channels 33, of which one is shown in the figure. In the distribution channel, for instance at the bend 34, a constriction can be arranged which determines the quantity of cooling oil in the respective channel. When the clutch is not engaged, cooling oil is distributed between the different discs through a number of small channels 35, each of which can be provided with its own constriction for individual control of the oil. The more direct embodiment of the clutch discs is described in more detail with reference to FIGS. 4-9. In FIGS. 2 and 3, a cooling oil tank 36, a pump 37 and a valve 38 are also indicated. The distribution of oil when the clutch is engaged is described with reference to FIG. 3.

When pressure oil through the channel 30 is fed to the hydraulic cylinder, i.e., chamber 31, the pressure plate 28 will be displaced to the position shown in FIG. 3. At the same time, pressure oil actuates the valve 38, which increases the flow of cooling oil. Through the increased supply of cooling oil, the oil ring 41 is formed, the maximum depth of which is determined by the overflow channels 39 By the numeral of a number of the splines 26, the cooling oil from the oil ring 41 has free passage to the distribution channels of the discs (see FIGS. 4-9) and the depth of the oil ring and the speed of the clutch then determines the cooling oil pressure which, in turn, determines the cooling oil flow through the clutch. The oil which has passed through the cooling grooves of the discs leaves these via the outlet 40. A number of splines 24 have also been removed, in order to give a free passage out for the cooling oil from the rear discs.

It is possible to replace the oil ring 41 with a seal at the place in FIG. 2 which has been designated 42, but in such a case the cooling oil, also when the clutch is engaged, must be distributed via the channels 35, and the cooling oil pressure must be controlled in some other way. Therefore, in general, the cooling oil ring described should offer the most simple method of achieving a stable cooling oil pressure and flow through the cooling grooves of the clutch discs, which are not easily influenced by external factors.

FIGS. 4, 6 and 8 each show a quadrant, i.e. one fourth of a clutch disc intended for the clutch shown in FIGS. 2 and 3. The figures show discs with external splines, but the groove pattern according to the invention could just as well be made with clutch discs with internal splines. FIG. 5 shows a cross section of FIG. 4 along the section V—V, FIG. 7 shows a cross section of FIG. 6 along the section VII-VII and FIG. 9 shows a cross section of FIG. 8 along the section VIII-VIII All cross sections, i.e. FIGS. 5, 7 and 9, are drawn in the scale of 5:1 compared with FIGS. 4, 6 and 8.

In all of the FIGS. 4-9, the designation 43 refers to splines, 44 refers to removed splines which serve as oil channels, 45 refers to internal distribution grooves, 46 refers to conveying grooves, and 47 refers to helical or circular cooling grooves which extend from the immediate vicinity of the inner edges 48 of the discs in several evenly distributed arcs over the front friction surface 49 of the discs, which end immediately in front of the outer edge 50 of the disc. Conveying grooves 46 in FIGS. 4 and 5 are provided with external constrictions 51, which are adapted so that when the clutch is engaged and there is a full flow of cooling oil, they continuously keep the collection grooves filled with cooling oil. An increasing counter-pressure is thereby generated against the outer edge of the disc against the cooling oil which is pressed through the cooling grooves 47, and as the influence of the centrifugal force also generates an oil pressure in the cooling grooves which increases with the distance from the center of rotation of the clutch, it will thereby be possible to obtain substantially the same fall of pressure over all cooling channels.

In FIG. 4, the upper surface of the cooling liquid ring 41 has been indicated and likewise, the increasing pressure from the center of rotation in the cooling oil. The distribution grooves 45 are illustrated with the designation $P_{45}$, while the counter-pressure in the conveying groove 46 has been designated $P_{46}$. From the diagram, inserted in figure 4, of the pressure distribution, it will be noted that the counter-pressure $P_{46}$ increasing from the center of rotation eliminates the increase in pressure which takes place in the part of the distribution grooves which covers the cooling grooves. This gives the same fall of pressure over all cooling grooves. In the diagram, the fall of pressure over the cooling grooves has been designated $P_{47}$. The presure increase in the oil ring is incuded as part of the pressure increase in the distribution grooves.

In FIGS. 6 and 7, the conveying grooves, here designated 52, have a more central position, i.e. they have no direct connection with the outer edge of the disc, but their outlet consists of a second set of cooling grooves 53 which, in turn, emerge in special outlet grooves 54. The fall of pressure over the first set of cooling grooves 47 has been designated $P_{47}$, while $P_{52}$ designates the fall of pressure over the cooling grooves 53. For the rest, the reference designations correspond to those in FIG. 4. Through this design, the same fall of pressure is obtained over all cooling grooves designated 47, while the pressure in the cooling grooves 53 increases with the distance from the center of rotation of the clutch. The various grooves and the depth of the oil ring are, as illustrated in the example of FIG. 4, dimensioned to keep the grooves 52 entirely filled with oil. This embodiment is comparatively simple to manufacture, and gives an entirely uniform cooling of the internal ring half of the clutch disc, while the cooling flow increases somewhat outwards in the outer ring half. In practice, however, this somewhat different cooling is of limited significance, as it only affects half of the clutch disc. It can also be eliminated entirely if, instead, the groove pattern shown in FIGS. 8 and 9 is used, in which the conveying grooves, here designated 55, have been provided with their own constricted outlets 56, which gives rise to a counter-pressure $P_{55}$ also in these grooves, whereby substantially the same fall of pressure can be obtained over all cooling grooves.

If the disc is to be provided with cooling patterns on both the front and rear sides, these should be displaced laterally, so that they do not cause unnecessary weakening of the disc.

The invention is not limited to the examples described above, but can be varied within the concept upon which the invention is based, such as this has been specified in the accompanying claims.

We claim:

1. A method of force cooling a rotatable wet disc clutch, of the type having a pair of relatively movable discs which are provided with friction surfaces coupled to and disposed centrally around the input and output shafts of the clutch, during the slipping-in and subsequent engagement of said friction surfaces, said method comprising the steps of continuously feeding a pressurized cooling liquid into the region between the friction surfaces of the discs along evenly distributed radial distribution grooves provided in the surfaces of the discs, said radial distribution grooves extending from the inner edges of the discs nearest the input and output shafts across part of the width of the discs but not across their entire width, passing the cooling liquid from said radial distribution grooves through a plurality of cooling grooves which emerge from the radial distribution grooves and which are evenly distributed in the friction surfaces of the discs in directions generally parallel to the direction of rotation of the clutch, passing the cooling liquid from the cooling grooves into conveying grooves communicating with the cooling grooves and arranged radially between the radial distribution grooves, the conveying grooves extending across part of the width of the discs but not all the way to their inner edges, and passing the cooling liquid through said conveying grooves to constricted outlets adjacent the outer edges of the discs, said distribution grooves, when the clutch is engaged, being kept constantly filled with said cooling liquid under pressure, said constricted outlets causing the conveying grooves at the same time to be kept entirely filled with cooling liquid flowing from the cooling grooves, whereby the cooling liquid passing through said distribution grooves and said cooling grooves is forced to overcome the counter-pressure arising in the conveying grooves resulting from the filling of the conveying grooves with liquid due to said constricted outlets, the pressure in the cooling liquid which is fed to the distribution grooves being so selected that its said pressure together with the influence of centrifugal force on the cooling liquid produced by rotation of the clutch is capable of forcing cooling liquid in a sufficient and evenly distributed quantity through all the grooves in the disc surfaces of the clutch in sequence to produce the desired cooling effect.

2. The method of claim 1 wherein the pressure in the cooling liquid which is fed to the distribution grooves is maintained at an appropriate value by continuously feeding the cooling liquid to a liquid ring of appropriate depth located inside the inner edge of the clutch discs.

3. The method of claim 2 wherein the maximum depth of the liquid ring is limited by overflow channels, the continuous addition of cooling liquid to said liquid ring being so controlled that a small excess flow into the overflow channels always occurs.

4. The method of claim 1 wherein the cooling liquid from said conveying grooves is distributed to an additional set of cooling grooves which run parallel to the first-mentioned cooling grooves and which serve as a constriction for the outlet of cooling liquid from the conveying grooves, the cooling liquid from said additional set of cooling grooves being conveyed to a set of radial outer outlet grooves which are in direct connection with the outer edge of the associated disc.

5. The method of claim 4 wherein the outlet of said outer outlet grooves adjacent the outer edge of the disc is constricted sufficiently to cause said outer outlet grooves to also be kept entirely filled with cooling liquid, the pressure in the cooling liquid which is fed to the distribution grooves together with the influence of centrifugal force on the cooling liquid being sufficient to overcome the friction in the cooling grooves and the total counter-pressure in both the conveying grooves and the outlet grooves thereby to produce the desired cooling flow through the clutch.

6. The method of claim 1 wherein the cooling liquid is also fed when the clutch is disengaged, the quantity of cooling liquid fed to the clutch with the clutch disengaged being substantially 1/10th the quantity fed to the clutch when said clutch is engaged.

7. A clutch disc for a liquid-cooled clutch of the type comprising coaxial input and output shafts which are respectively coupled to a pair of ring-shaped radially extending relatively axially movable friction surfaces disposed around said shafts, one of said friction surfaces being provided on said clutch disc in facing relation to the other of said friction surfaces, the friction surface of said disc having a groove pattern therein through which a cooling liquid may be circulated between said friction surfaces to force-cool the clutch, said groove pattern comprising a plurality of radial distribution grooves which extend from the inner edge of the disc partially across the width of the disc towards its outer edge, and a plurality of radial conveying grooves located between said distribution grooves, said radial conveying grooves also extending only partially across the width of said disc and communicating with constricted outlets disposed adjacent the outer edge of the disc, said distribution grooves and said conveying grooves being connected to one another via a plurality of cooling grooves which extend substantially parallel to each other around the axis of rotation of the clutch, said constricted outlets being dimensioned to achieve the build-up of a fluid counter-pressure in the cooling liquid in said radial conveying grooves operative to assure that, when the clutch is engaged, each of said cooling grooves contains a substantially constant quantity of cooling liquid under pressure.

8. The clutch disc of claim 7 wherein the constricted outlet of each of said conveying grooves consists of a constriction in the cross-sectional area of the portion of the conveying groove nearest the outer edge of the disc.

9. The clutch disc of claim 7 wherein the constricted outlet of each of said conveying grooves comprises a further plurality of cooling grooves disposed parallel to the first-mentioned plurality of cooling grooves, said further plurality of cooling grooves communicating with a plurality of outer outlet grooves which, in turn, emerge at the outer edge of the disc.

10. The clutch disc of claim 9 wherein each of said outer outlet grooves is provided with a constriction in the cross-sectional area of the portion of the groove nearest the outer edge of the disc.

11. The clutch disc of claim 7 wherein said cooling grooves run in the form of a helix, which is interrupted by said distribution and conveying grooves, from a location near the inner edge of the disc to a location near the outer edge of said disc.

12. The clutch disc of claim 9 wherein said distribution and outlet grooves are arranged along common radial lines and are separated from one another by a portion of the friction surface of the disc acting as a separating wall, said radial conveying grooves being positioned respectively between adjacent pairs of said radially aligned distribution and outlet grooves.

* * * * *